Patented Apr. 13, 1943

2,316,196

UNITED STATES PATENT OFFICE 2,316,196

POLYVINYL HALIDE COMPOSITION

Harold Tucker, Cuyahoga Falls, Ohio, assignor to The B. F. Goodrich Company, New York, N. Y., a corporation of New York No Drawing. Application January 16, 1941, Serial No. 374,697

5 Claims. (Cl. 260—32)

This invention relates to polyvinyl halide compositions and pertains specifically to heat-stabilizers for plasticized polyvinyl halide compositions.

Resilient plasticized compositions of polymers made largely from a vinyl halide, such as gamma-polyvinyl chloride, polyvinyl bromide, or copolymers of vinyl chloride with minor proportions of vinyl esters such as vinyl acetate or vinyl cyanide, or of vinylidene chloride are well known to be useful as chemically resistant protective coatings. Articles protected with these materials are resistant to acids, alkalies, oxidizing and reducing agents, water, oil, and many other reagents which have a deleterious effect upon other commonly used resilient materials such as rubber.

One of the common methods of application of these plastic compositions is by dipping the article to be coated in a solution of the material in a suitable solvent, such as methyl ethyl ketone, mesityl oxide, chlorobenzene, chlorotoluene, dichlorobenzene, trichlorobenzene, etc. In applying relatively thick coatings to metallic articles it has been found desirable to use a chlorinated aromatic hydrocarbon solvent, such as chlorobenzene or chlorotoluene, rather than one of the other possible solvents because of the higher gel point of the former, which permits the formation of a thicker coating after an equal number of dips at the same temperature. The solutions employed, because of their high solids content, are usually gels at room temperature and so must be heated to about 70° to 90° C. for the dipping process. At these temperatures, however, in the presence of certain metals, notably zinc, iron, copper, and brass, the polymer solution undergoes a slow gelation process, often accompanied by a discoloration, which requires from about three to twenty days depending upon the exact temperature at which the solution is kept. This gelation, or "setting up" of the solution renders it unfit for use and cannot be remedied, once it has occurred, by any device known. Since many of the articles which could advantageously be coated with the above polymers, such as racks for metal plating baths, acid containers, etc. frequently contain at least a small proportion of one of the above metals, the solutions may be used for only a limited time before being discarded, instead of being employed continuously or intermittently over a long period of time.

I have now discovered that the addition of small amounts of the anhydrides of unsaturated short chain dibasic acids of the general formula

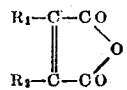

where $R_1$ and $R_2$ are hydrogen or alkyl groups, such as maleic anhydride, citraconic anhydride, methyl citraconic anhydride, dimethyl maleic anhydride, ethyl citraconic anhydride, diethyl maleic anhydride, etc., retards very greatly the gelatin or decomposition of such solutions.

Extremely small amounts of these stabilizers are effective in retarding the decompositions, but larger amounts, up to the limit of solubility of the compound in the polymer solution produce no harmful results. In general, I prefer to use from 0.1% to 1.0% of the stabilizer by weight, based on the weight of the solution.

As a specific example of my invention, I have prepared a solution containing 6.75 parts by weight of gamma polyvinyl chloride, 2.25 parts of tricresyl phosphate, 0.3 part of maleic anhydride, and 91 parts of chlorotoluene. When heated in contact with brass at a temperature of about 102° to 130° C., this solution showed no indications of aging after two months. A similar solution with no stabilizer was completely gelled after 18 days. Similar results may be obtained with other compounds in this class.

My new stabilizers may be used with any polymer in which the predominant constituent is vinyl chloride, such as alpha, beta, or gamma polyvinyl chloride and copolymers of vinyl chloride with minor proportions of vinyl acetate, vinyl cyanide, vinylidene chloride, and the like. Any of the ordinary plasticizers, among which are tricresyl phosphate, dibutyl phthalate, butyl phthalyl, butyl glycollate, etc., may be used in these compositions, as well as any of the common pigments and fillers, such as barytes, clay, whiting, etc. Dyes, softeners, and other ingredients may be added to obtain special effects.

Although I have herein disclosed specific examples of my invention, I do not intend to limit myself solely thereto, but only as indicated by the spirit and scope of the appended claims.

I claim:

1. A composition comprising a polymer in which the predominant constituent is vinyl chloride, a chlorinated aromatic hydrocarbon solvent, and maleic anhydride.

2. A composition comprising gamma polyvinyl chloride, chlorobenzene, and maleic anhydride.

3. A composition comprising gamma polyvinyl chloride, chlorotoluene, and maleic anhydride.

4. A composition comprising a polymer in which the predominant constituent is vinyl chloride, a chlorinated aromatic hydrocarbon solvent, and a compound having the structural formula

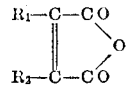

wherein $R_1$ and $R_2$ are members of the class consisting of hydrogen and alkyl groups.

5. A composition comprising gamma polyvinyl chloride, a chlorinated aromatic hydrocarbon solvent, and a compound having the structural formula

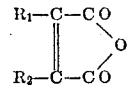

wherein $R_1$ and $R_2$ are members of the class consisting of hydrogen and alkyl groups.

HAROLD TUCKER.